(12) United States Patent  (10) Patent No.: US 8,137,034 B2
Noureddine  (45) Date of Patent: Mar. 20, 2012

(54) TOOL SYSTEM

(75) Inventor: Hassan Noureddine, Nehren (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 476 days.

(21) Appl. No.: 12/361,133

(22) Filed: Jan. 28, 2009

(65) Prior Publication Data

US 2009/0196698 A1 Aug. 6, 2009

Related U.S. Application Data

(63) Continuation of application No. PCT/EP2007/006662, filed on Jul. 27, 2007.

(51) Int. Cl.
*B23C 5/28* (2006.01)
*B23B 27/10* (2006.01)

(52) U.S. Cl. ............... 407/11; 407/103; 407/113

(58) Field of Classification Search ............. 407/2, 6, 407/11, 101–104, 113, 99, 15; 408/56, 57; B23C 5/28; B23B 27/10
See application file for complete search history.

(56) References Cited

U.S. PATENT DOCUMENTS

| | | | | |
|---|---|---|---|---|
| 3,486,378 A * | 12/1969 | Carlson | ........... | 374/127 |
| 3,889,520 A * | 6/1975 | Stoferle et al. | ........... | 73/37.5 |
| 4,535,216 A * | 8/1985 | Cassidenti | ........... | 219/68 |
| 5,647,699 A * | 7/1997 | Martin et al. | ........... | 407/33 |
| 5,833,403 A * | 11/1998 | Barazani | ........... | 407/101 |
| 6,132,146 A | 10/2000 | Satran et al. | | |
| 6,234,724 B1 * | 5/2001 | Satran et al. | ........... | 407/43 |
| 6,273,649 B1 * | 8/2001 | Ziegler | ........... | 407/101 |
| 6,488,450 B2 * | 12/2002 | Norris | ........... | 407/35 |
| 2001/0007215 A1 * | 7/2001 | Murata et al. | ........... | 83/16 |
| 2004/0151551 A1 | 8/2004 | Oettle | | |
| 2004/0161312 A1 * | 8/2004 | Hole et al. | ........... | 407/101 |
| 2004/0240949 A1 * | 12/2004 | Pachao-Morbitzer et al. | . | 407/11 |
| 2006/0053987 A1 * | 3/2006 | Ghosh et al. | ........... | 82/1.11 |
| 2006/0078392 A1 * | 4/2006 | Berger et al. | ........... | 408/227 |
| 2009/0185873 A1 * | 7/2009 | Noureddine | ........... | 407/40 |
| 2011/0027021 A1 * | 2/2011 | Nelson et al. | ........... | 407/11 |
| 2011/0027023 A1 * | 2/2011 | Prichard et al. | ........... | 407/11 |
| 2011/0027024 A1 * | 2/2011 | Prichard et al. | ........... | 407/11 |

FOREIGN PATENT DOCUMENTS

DE 30 04 166 A1 7/1979

(Continued)

*Primary Examiner* — Boyer D Ashley
*Assistant Examiner* — Sara Addisu
(74) *Attorney, Agent, or Firm* — Turocy & Watson, LLP

(57) ABSTRACT

The present invention relates to a tool system that has a holder with a supply device for cooling lubricant, a cutting tool which has a tool cutter and a fixing part, and a tensioning device which has a tension screw by which a tension force acting upon the cutting tool can be produced for the purpose of fixing the cutting tool in position on the holder. A support face is realized on the holder for direct bearing contact of the fixing part of the cutting tool that is pressed-on by the tensioning screw, and a fluid space which adjoins this support face is delimited by wall parts of the bearing fixing part of the cutting tool and is fluidically connected to the supply device for cooling lubricant, and from which cooling lubricant can be passed on to the region of the main cutter via a channel which, provided in the cutting tool, comes from the adjoining wall of the fixing part.

18 Claims, 4 Drawing Sheets

FOREIGN PATENT DOCUMENTS

| | | | |
|---|---|---|---|
| DE | 3740814 A1 * | 6/1989 | |
| DE | 34 48 086 C2 | 12/1991 | |
| DE | 92 03 373.3 | 6/1992 | |
| DE | 299 11 894 U1 | 10/1999 | |
| EP | 100376 A2 * | 2/1984 | |
| EP | 0 100 376 A2 | 2/1992 | |
| EP | 599393 A1 * | 6/1994 | |
| EP | 0 767 023 A1 | 2/1996 | |
| JP | 07237006 A * | 9/1995 | |
| JP | 08039387 A * | 2/1996 | |
| JP | 2006263846 A * | 10/2006 | |
| JP | 2010179380 A * | 8/2010 | |

* cited by examiner

TOOL SYSTEM

CROSS-REFERENCE TO RELATED APPLICATIONS

This is a continuation application of international patent application PCT/EP2007/006662, filed Jul. 27, 2007, designating the U.S. and published in German as WO 08/014933 A1, which claims priority to German application no. 10 2006 035 182, filed Jul. 29, 2006. The entireties of which are incorporated herein by reference.

BACKGROUND OF THE INVENTION

1. Field of the Invention

The invention relates to a tool system, comprising a holder, a cutting tool which has a tool cutter and a fixing part, and a tensioning device, which has a tensioning screw by means of which a tension force acting upon the cutting tool can be produced for the purpose of fixing the latter in position on the holder, and comprising a supply device, provided in the holder, for cooling lubricant. In addition, the invention relates to a cutting tool and to a holder for such a tool system.

2. Related Prior Art

A tool system of this type is already known from the document EP 0 767 023 A1. When such tool systems are used for machining operations with high rates of material removal, for example when used as a broaching tool, secure and rigid fastening of the cutting tool to the holder is of critical importance, particularly in machining operations that must be performed with a high degree of precision. In addition to the cutting tool being securely supported on the holder, an adequate supply of cooling lubricant must be ensured, it being particularly important to ensure that the supply is effected directly to the critical working region and in a manner that is conducive to taking away the removed material.

SUMMARY OF THE INVENTION

The known tool system mentioned cannot sufficiently fulfill these requirements. With regard thereto, the invention is based on the object of making available a tool system which, despite a simple design, renders possible a secure and effective supply of operational resources, such as cooling lubricant, and which is distinguished in that the cutting tool is rigidly and securely fixed in place on the holder.

This object is achieved, according to the invention, by a tool system comprising: a holder comprising a supply device for cooling lubricant, a cutting tool which has a tool cutter and a fixing part, and a tensioning device, which has a tensioning screw by means of which a tension force acting upon the cutting tool can be produced for the purpose of fixing the latter in position on the holder, wherein a support face is realized on the holder for direct bearing contact of the fixing part of the cutting tool that is pressed-on by the tensioning screw, and wherein there is constituted a fluid space which adjoins this support face, is delimited by wall parts of the bearing fixing part of the cutting tool and is fluidically connected to the supply device for cooling lubricant, and from which cooling lubricant can be passed on to the region of the main cutter via a channel which, provided in the cutting tool, comes from the adjoining wall of the fixing part.

Accordingly, an essential characteristic of the invention is that a fluid space is provided in the region of a support face of the holder that is provided for the direct bearing contact of the fixing part of the cutting tool, which fluid space is fluidically connected to a supply device for cooling lubricant realized in the usual manner in the holder and from which this cooling lubricant can be passed on directly to the critical region on the main cutter, via a channel provided in the cutting tool.

Whereas, in the case of the above-mentioned, known solution, the cutting tool is clamped in an adapter which serves as an intermediate holder and which, in turn, can be constrained by the holder, there is achieved in the case of the direct bearing contact of the cutting tool, as provided according to the invention, both a simplification of the structural requirement and an improvement in respect of the cutting tool being rigidly secured in position on the holder. At the same time, optimal supply of cooling lubricant to the critical region on the main cutter of the cutting tool is ensured via the fluid space provided in the region of the support face of the holder and via the adjoining channel in the cutting tool.

The fluid space can be so realized that it lies on the support face within the holder, or it can be realized within the fixing part of the respective cutting tool or also both partly in the holder and partly in the fixing part.

In the case of preferred exemplary embodiments, a threaded bore for the tensioning screw is located within the support face in the holder, the fluid space being constituted by a widened portion of the end portion of the threaded bore, which widened portion constitutes a recess in the support face. Such exemplary embodiments are distinguished by a particularly simple design.

The arrangement can be so realized that the supply device, provided in the holder, for cooling lubricant has a channel extending in the longitudinal direction in the holder, and has a connecting channel which branches off from this channel and extends obliquely relative to the axial direction, and whose outlet aperture is located in the fluid space.

In the case of a particularly advantageous exemplary embodiment, in which the tool cutter for material-removing machining projects over the holder by a predefinable projecting length, the holder can be provided, on its outer circumference, with a support part which projects in the direction of the projecting length of the tool cutter and constitutes the continuation of the support face for an at least partial bearing contact of the cutting tool. The cutting tool is thereby supported against the operating stresses, not only within the circumferential region of the holder, but also in a region located outside the circumferential region of the holder, i.e. at the location which is adjacent to the projecting tool cutter. Cutting forces and generated moments are therefore passed into the holder via the projecting support part, directly adjacent to the gripping location, this being conducive to reduction of the load moments acting on the fixing part of the cutting tool.

The holder preferably has the form of a shank defining a longitudinal axis, the support part being constituted by a support body which, in relation to the longitudinal axis, projects radially from the circumferential surface of the shank and is integral with the latter. Owing to the support being provided by means of a body which is integral with the shank, a particularly rigid connection is achieved between the cutting tool and the holder.

In the case of particularly advantageous exemplary embodiments, the shank, at least at its free end, constitutes a solid of revolution, a recess that is open on the front face and on the circumference of which shank constituting a seat for receiving the fixing part of the cutting tool.

The arrangement in this case can be so realized that the support body axially adjoins the seat in such a way that its support face facing towards the front end face of the shank constitutes a continuation of the rearward end face of the seat, which continuation projects radially over the circumference of the solid of revolution. The support body, together with the rearward end face of the seat, thus constitutes a continuous support face for the cutting tool which, by means of a flat bearing face of its fixing part, can bear with positive bearing contact on the flat rearward end face of the seat and on the support face of the support body that continues this end face. In other words, a flat bearing contact is thereby achieved, starting from the base of the recess, as far as the radially outer end of the support body.

If the tool system is provided for machining in which there occur force components of the cutting force which act along the longitudinal axis, for example when the tool system is provided as an impact tool, the bearing face of the fixing part, the rearward end face of the seat and the adjoining support face of the support body are preferably located in a radial plane.

In the case of particularly advantageous exemplary embodiments, the cutting tool has the form of a block, preferably composed of a hard-metal material, whose cutter part constitutes a continuation of the fixing part, this continuation constituting the cutter part being formed in such a way that it constitutes the projection of the tool cutter beyond the holder and the support body, and the continuation cooperating, by means of an end face as part of the bearing face, with the support face of the support body, and the tool cutter having at least one cutting edge which is located on or near the front end side of the cutter part that faces towards the front face of the holder.

In this case, there can be at least one main cutter which extends, on the front side of the continuation, in a plane parallel to the support face. In the case of translational movement of the holder, the system thereby constitutes a broaching tool.

For expedient material-removal shaping, provision can be made in this case whereby the front side of the continuation that is opposite the rearward end face has a material-removing face, with a slight convexity, which adjoins the main cutter and which is so selected that, depending on the characteristics of the workpiece, the cutting conditions and the like, the desired material-removal flow is obtained.

In the case of advantageous exemplary embodiments, the block of the cutting tool has, at least over the majority of the fixing part, an overall wedge-shaped outline with side walls, which diverge in a V shape out from a vertex region opposite the continuation.

In the case of such a shape, for the purpose of cooperation with the side walls of the fixing part of the cutting tool, the seat can have seat walls having a course which diverges radially outwards from a base of a recess.

In order to ensure optimum seat conditions, the arrangement is preferably so realized that the side walls of the fixing part of the cutting tool which cooperate with the seat walls have partial regions which diverge from the plane, a convex shape being provided, for example, in the contact region between the side walls and the seat walls.

Subject-matter of the invention are also a cutting tool and a holder for a cutting tool.

BRIEF DESCRIPTION OF THE DRAWING

The invention is explained in detail in the following with reference to the drawings, wherein.

DESCRIPTION OF A PREFERRED EMBODIMENT

Figure 1:
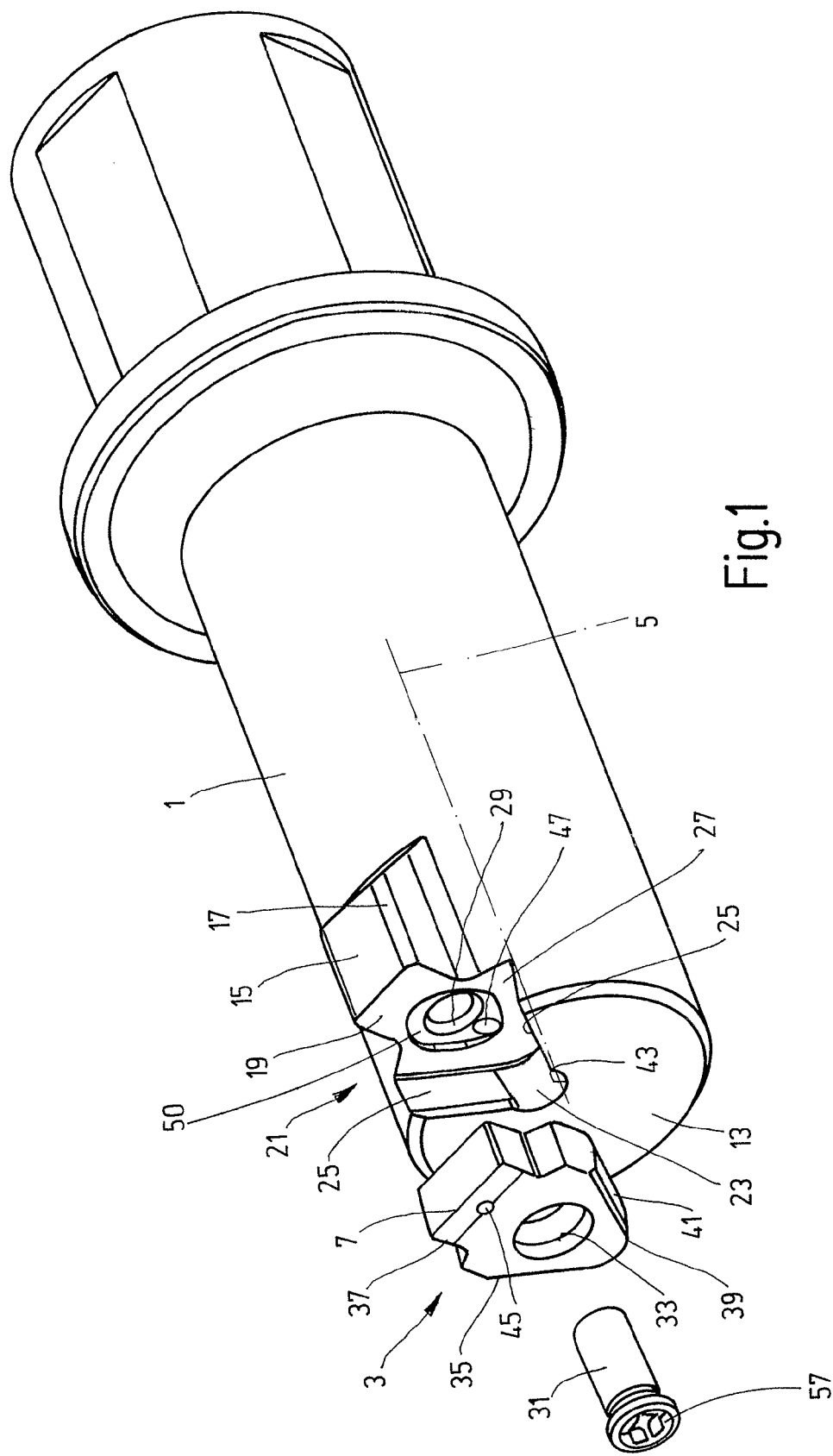
FIG. 1 shows an exploded, perspective oblique view of an exemplary embodiment of the tool system according to the invention.

The invention is explained in the following with reference to an exemplary embodiment, wherein the tool system constitutes a broaching tool, the holder 1, with the cutting tool 3 fixed thereto at an end, being moved in the direction of the holder longitudinal axis 5 in order to perform broaching machining, by means of a main cutter 7 of the cutting tool 3, on a workpiece, which is not shown, the main cutter 7 extending perpendicularly relative to the longitudinal axis 5. Operative in the working operation, when in use as a broaching tool, is a cutting or working force which, for the most part, is directed along the longitudinal axis 5. In the case of an alternative application of the tool system, for rotary machining or drilling, in which a material-removal operation can be effected at cutters 9 and/or 11 next to the main cutter 7, see FIG. 3, a force component is also produced along the longitudinal axis 5.

Figure 2:
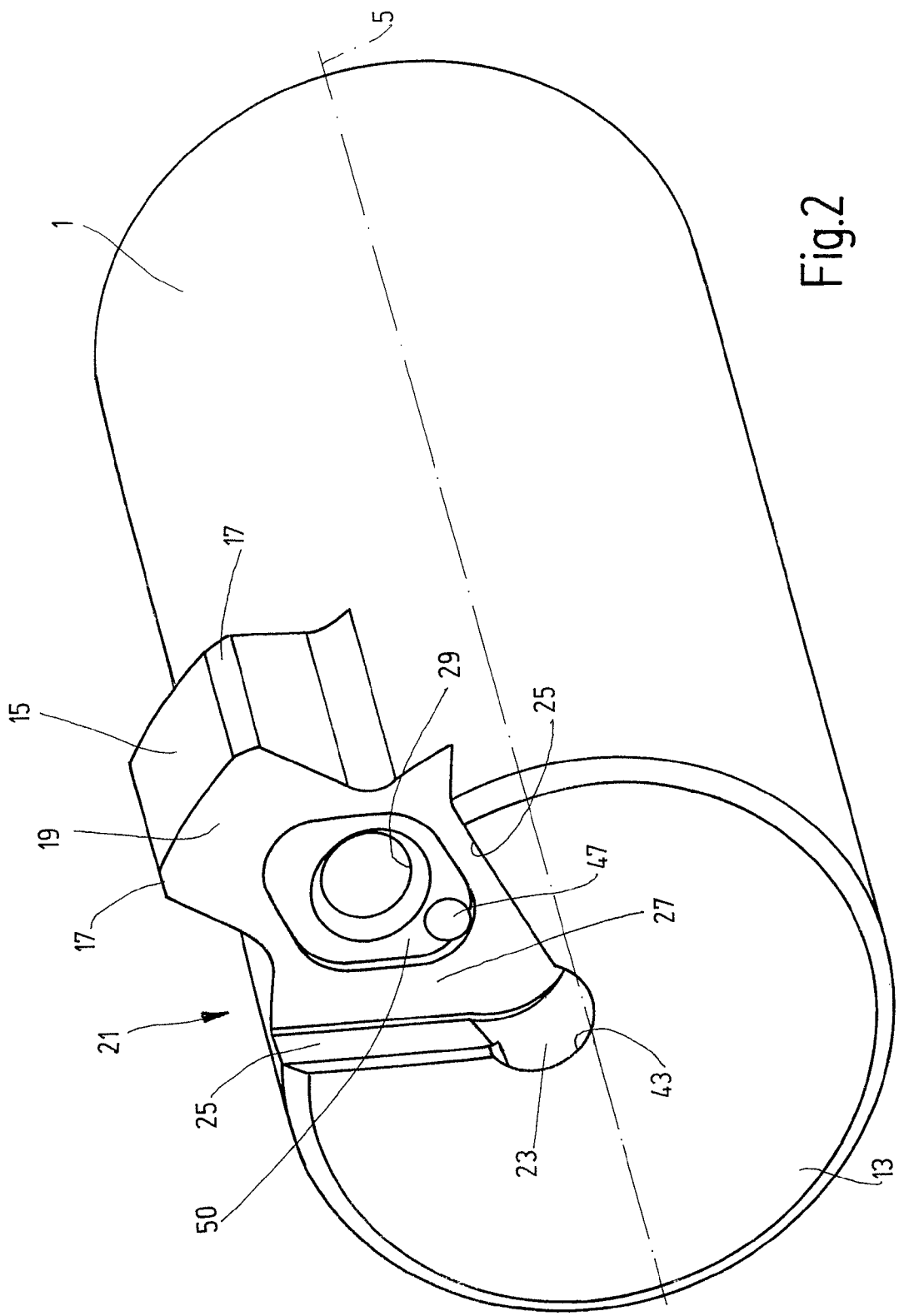
FIG. 2 shows a perspective oblique view, enlarged by comparison with FIG. 1, of only the front end portion of the holder of the exemplary embodiment, without mounted cutting tool.

FIGS. 1 and 2 illustrate the support, provided in the case of the invention, of the cutting tool 3 on the holder 1, which has the form of a shank constituting a solid of revolution, there being realized in proximity to the front face 13 of the holder 1 a support body 15, which is realized to be integral with the latter and which projects radially. The support body 15 has the form of a block which is beveled slightly towards its top or outside and which, apart from its beveled edges 17, has an approximately square cross-section. On its side which faces towards the front face 13, the support body 15 constitutes a flat support face 19 lying in a radial plane. This support face is at an axial distance from the front face 13 of the holder 1, which distance corresponds to the axial extent of a seat 21 which is provided on the holder 1 and in which the cutting tool 3 can be received and fixed in position.

As can be seen from FIGS. 1 and 2, the seat 21 is constituted by a recess which is open on the front face 13 and on the circumference of the holder 1. This recess, starting from the recess base 23, which is located in proximity to the longitudinal axis 5, has seat walls 25 which, starting from the base 23 and diverging from each other, extend towards the outer circumference of the holder 1. The receiving space of the seat 21 for receiving the cutting tool 3 therefore has a V-shaped cross-section.

The rearward end face 27 of the seat 21 lies in a common plane with the support face 19 of the support body 15, such that the support face 19 constitutes a direct continuation of the rear end face 27 of the seat 21. A continuous, plane contact face, as a total support face 19, 27 which, by means of the support face 19 of the support body 15, continues radially beyond the outer circumference of the holder 1, is thus available for the cutting tool 3 fixed in the seat 21.

The cutting tool 3 has, on its back side that is opposite the front cutter 7, a plane bearing face which, when the cutting tool 3 has been received in the seat 21, bears positively on the rear end face 27 and the radially continuing support face 19. As can be seen from FIGS. 1 and 2, at the transition region between the end face 27 and the support face 19 there is a threaded bore 29 for a tensioning screw 31 in the form of a countersunk-head screw which engages through a through-bore 33 in the cutting tool 3 and by means of which the cutting tool 3 can be clamped in the seat 21, the fixing part 35 of the cutting tool 3 bearing laterally on the seat walls 25 by means of side walls 41, and that cutter part 37 of the cutting tool 3 which is adjacent to the cutter 7 bearing on the support face 19 of the support body.

As can also be seen from the figures, the fixing part 35 of the block-shaped cutting tool 3 has an overall wedge shape which is matched to the V-shaped receiving cross-section of the seat 21, the wedge shape being rounded off in the lower vertex region 39. The side walls 41 of the fixing part 35, which extend in a diverging manner from the vertex region 39, have surface regions which face away from the flat shape or have a certain convex shape for optimal bearing contact on the seat walls 25. As shown by FIGS. 1 and 2, at the base 23 of the recess constituting the seat 21 the ends of the seat walls 25 are separated from each other by an opening 43 in the form of a partial bore, such that there is produced at the base 23 a clearance between the holder 1 and the vertex region 39 of the cutting tool received in the seat 21.

Figure 3:
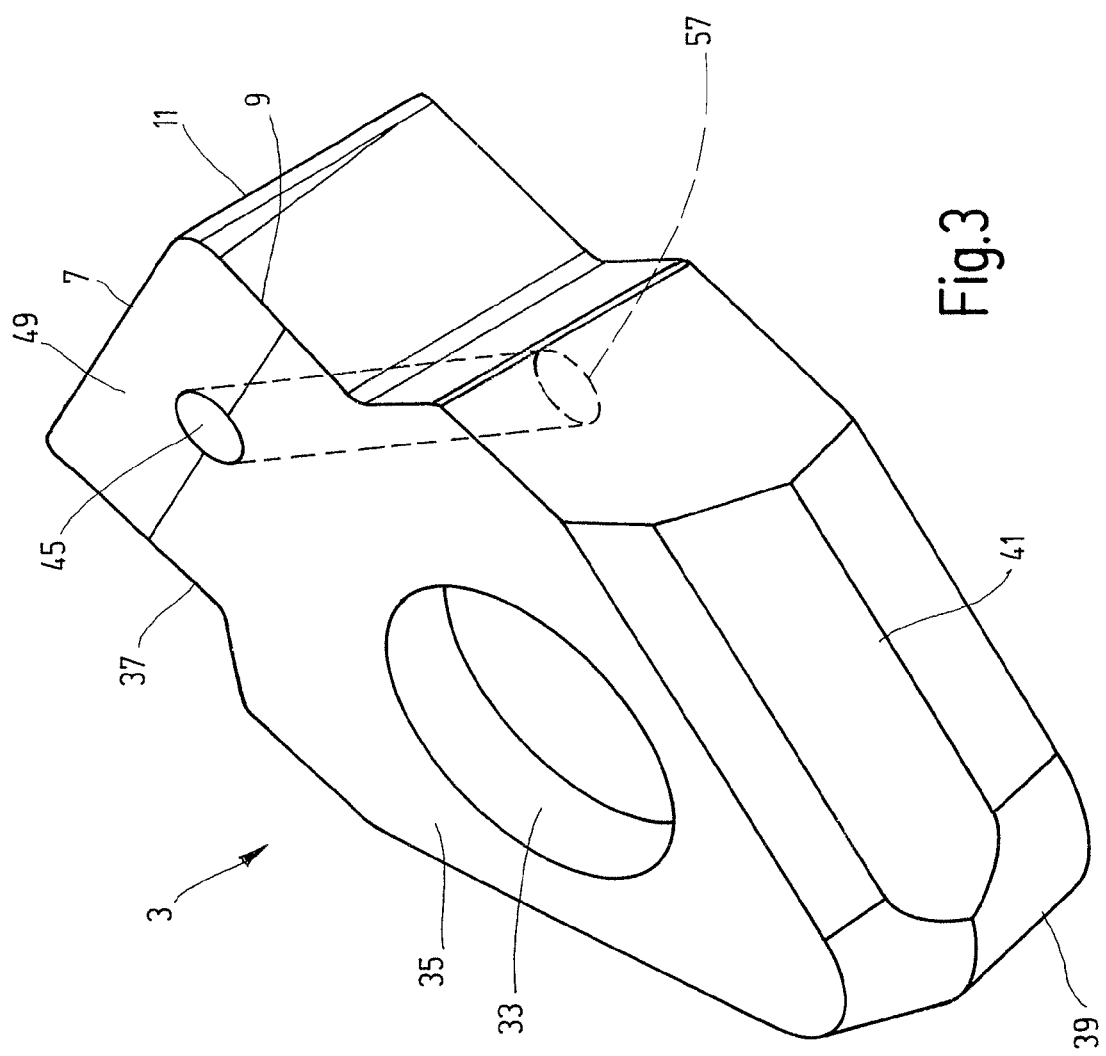
FIG. 3 shows a perspective oblique view, represented in even larger scale, of only a cutting tool for use in the tool system according to the invention.
Figure 4:
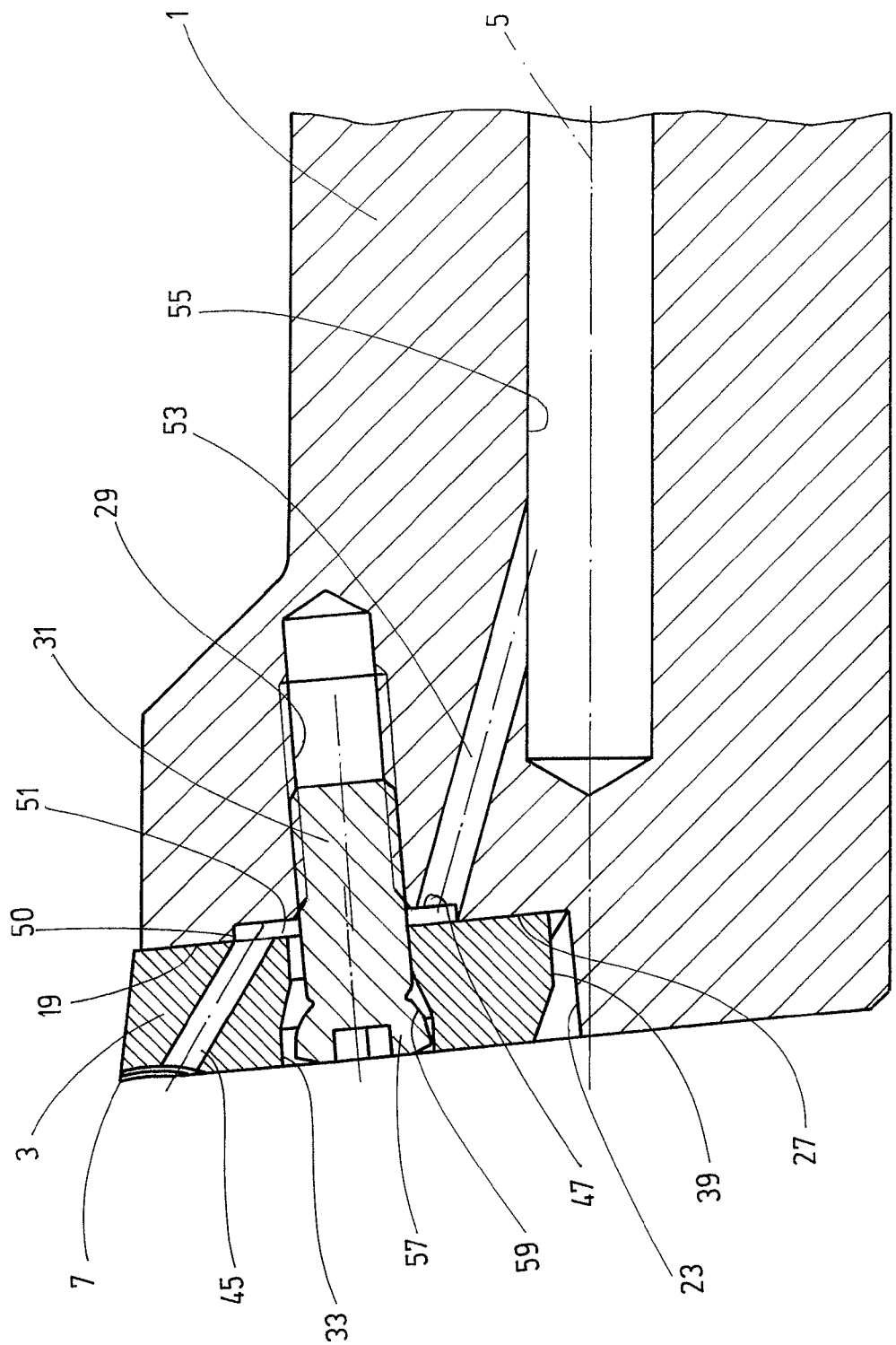
FIG. 4 shows a longitudinal section, in approximately the same scale as FIG. 2, of only the front portion of the tool system.

As shown by FIG. 3, the cutting tool 3 has a channel 45 for a cooling lubricant, the channel 45 opening out in proximity to the main cutter 7. FIG. 4 shows more particular details of the supply of the cooling lubricant to the channel 45 of the cutting tool 3, as well as details of the tensioning device constituted by the threaded bore 29 and the tensioning screw 31. As can be seen, the threaded bore 29 has a widened portion 50 at the end which adjoins the end face 27 of the seat 21. When the cutting tool 3 has been received in the seat 21, there is thereby constituted an annular space 51, which surrounds the tensioning screw 31 and is closed by the bearing wall of the fixing part 35, and into which there opens the outlet aperture 47 of a supply device realized in the usual manner in the holder 1. In the case of the present example, this supply device has a connecting channel 53 extending obliquely in the holder 1 between the outlet aperture 47 on the annular space 51 and a longitudinal channel 55 in the holder 1. As a result, upon tensioning of a cutting tool 3 that comprises a channel 45 whose channel inlet 57 is located at the back, close to the bore 33, in the annular space 51 and extends from there in an oblique course as far as the channel outlet of the channel 45, close to the main cutter 7, there is obtained a continuous fluidic connection via which cooling lubricant directly reaches the critical region on the main cutter 7.

As can also be seen from FIG. 4, the positional relationships between the seat walls 25 of the seat 21 in the holder 1 and the side walls 41 of the cutting tool 3 are so selected that the bore 33 in the cutting tool 3, when the side walls 41 of the latter bear on the side walls 25 of the seat 21, is slightly eccentric relative to the axis of the threaded bore 29. Upon the tensioning screw 31 being tightened, the latter, by means of a conical surface 59 on the screw head 57, therefore comes to bear on the end edge of the through-bore 33 in the cutting tool 3, such that, as can be seen from FIG. 4, upon the tensioning screw 31 being tightened, there is produced not only a tension force against the end face 27 of the seat 21, but also a force component which pretensions the cutting tool 3 towards the base 23 of the seat 21, as a result of which the cutting tool 3 becomes fixed in position in the seat 1 in a particularly secure and firm manner.

I claim:

1. A tool system, comprising:
    a holder comprising a supply device for cooling lubricant;
    a cutting tool which has a tool cutter and a fixing part;
    a tensioning device, which has a tensioning screw by which a tension force acting upon the cutting tool can be produced for the purpose of fixing the latter in position on the holder,
    wherein a support face is realized on the holder for direct bearing contact of the fixing part of the cutting tool that is pressed-on by the tensioning screw,
    wherein there is a fluid space adjoining the support face, the fluid space being delimited by the bearing fixing part of the cutting tool and being fluidically connected to the supply device for cooling lubricant, and from which cooling lubricant can be passed on to the region of a main cutter via a channel formed in the cutting tool, the channel originating at an adjoining wall of the fixing part,
    wherein a threaded bore for the tensioning screw is located in the holder, within the support face, and wherein the fluid space is realized around the tensioning screw and within that region of the holder that adjoins the support face.

2. The tool system according to claim 1, wherein the fluid space is constituted by a widened portion of the end portion of the threaded bore, which widened portion constitutes a recess in the support face.

3. The tool system according to claim 1, wherein the supply device, provided in the holder, for cooling lubricant, has a channel extending in the longitudinal direction in the holder, and has a connecting channel, which branches off from this latter channel and extends obliquely relative to the axial direction, and the outlet aperture of the connecting channel is located in the fluid space.

4. The tool system according to claim 1, wherein the tool cutter projects over the holder by a predefined projecting length, and the holder is provided, on its outer circumference, with a support part that projects in a direction of the projecting length of the tool cutter and constitutes a continuation of the support face for an at least partial bearing contact of the cutting tool.

5. The tool system according to claim 4, wherein the holder has a form of a shank defining a longitudinal axis, and the support part is constituted by support body which, in relation to the longitudinal axis, projects radially from the circumferential surface of the shank and is integral with the support part.

6. The tool system according to claim 5, wherein the shank has a recess that is open on the front face and on the circumference of which shank constituting a seat for receiving the fixing part of the cutting tool.

7. The tool system according to claim 6, wherein the support body axially adjoins the seat in such a way that its support face facing towards the front end face of the shank constitutes a continuation of a rearward end face of the seat, which continuation projects radially over the circumference of the solid of revolution.

8. The tool system according to claim 7, wherein the fixing part of the cutting tool has a flat bearing face for positive bearing contact on the flat rearward end face of the seat and on the support face of the support body that continues this end face.

9. The tool system according to claim 8, wherein the bearing face of the fixing part, the rearward end face of the seat and the adjoining support face of the support body are located in a radial plane in order to absorb force components of the cutting force that act along the longitudinal axis.

10. The tool system according to claim 7, wherein the cutting tool has the form of a block, composed of a hard-metal material, whose cutter part constitutes a continuation of the fixing part, the continuation being formed in such a way that the tool cutter projects beyond the holder and the support body, and the continuation cooperating, by an end face as part of the bearing face, with the support face of the support body, and the tool cutter having at least one cutting edge which is located on or near the front side of the cutter part that faces towards the front face.

11. The tool system according to claim 10, wherein there is at least one main cutter that extends, on the front side of the continuation, in a plane parallel to the support face.

12. The tool system according to claim 11, wherein the front side of the continuation has a material-removing face, with a slight convexity, adjusting the main cutter.

13. The tool system according to claim 10, wherein the block of the cutting tool has, at least over the majority of the fixing part, an overall wedge-shaped outline with side walls which, going out from a vertex region opposite the continuation, diverge in a V shape.

14. The tool system according to claim 13, wherein for the purpose of cooperation with the side walls of the fixing part of the cutting tool, the seat has seat walls having a course which diverges radially outwards from a base of a recess.

15. The tool system according to claim 14, wherein the side walls of the fixing part of the cutting tool that cooperate with the seat walls have partial regions, which diverge from the plane.

16. The tool system according to claim 15, wherein the base of the recess of the shank constituting the seat has an opening that constitutes a distance from at least one of the vertex of the wedge shape of the fixing part and the vertex region of the fixing part has a shortening that produces this distance.

17. The tool system according to claim 1, wherein the cutting tool further comprises: a fixing part, which has a face for bearing contact on a support face of a tool holder; and a tool cutter at a distance from the fixing part and the channel, wherein the channel extends to an opening region of the fixing part in proximity to the tool cutter.

18. A holder for the cutting tool of the tool system according to claim 1, wherein the holder for the cutting tool further comprises: a support face for the bearing contact of a cutting tool that can be pressed-on by means of a tensioning device; and a fluid space, which is realized on the support face and which is fluidically connected to a supply device for cooling lubricant provided in the holder, wherein a threaded bore for the tensioning screw is located in the holder, within the support face, and wherein the fluid space is realized around the threaded bore and within that region of the holder that adjoins the support face.

* * * * *